Figure 1:
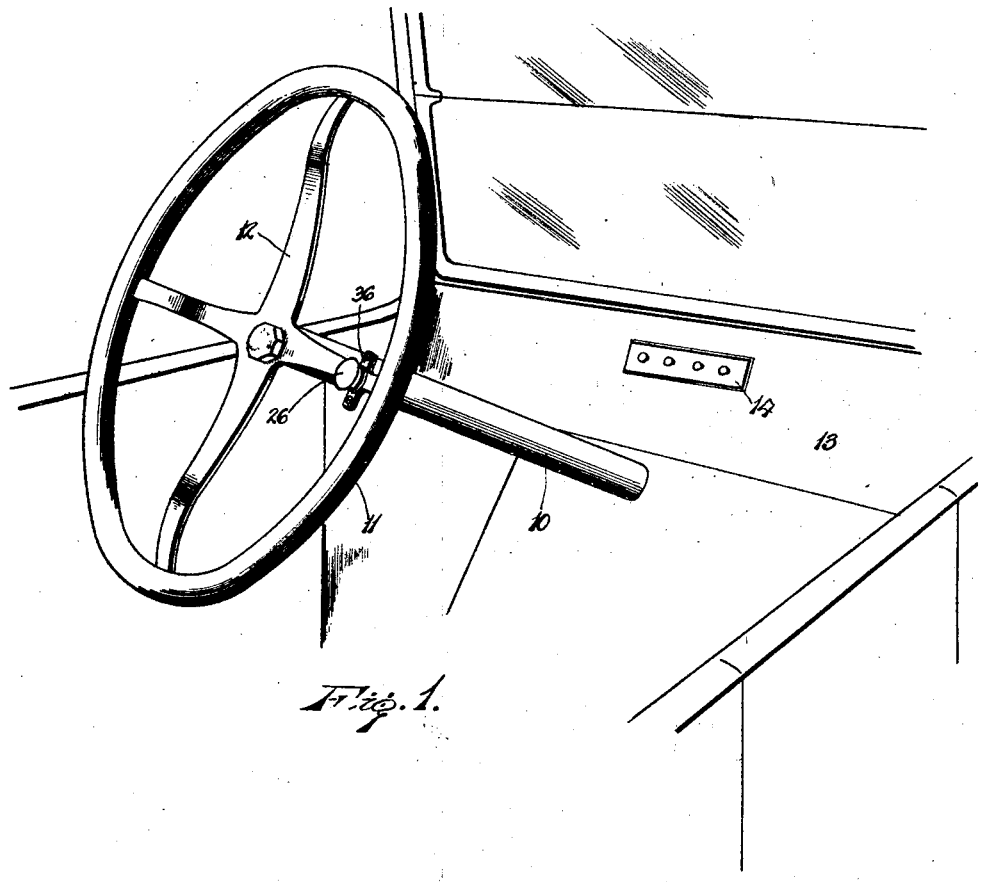

Nov. 4, 1924.　　　　　1,514,155
C. W. HALL ET AL
HEADLIGHT CONTROL
Filed March 2, 1921　　　2 Sheets-Sheet 1

Inventor
C. W. Hall.
H. E. DeJarnette.

By Lacey & Lacey, Attorneys

Nov. 4, 1924.

C. W. HALL ET AL 1,514,155

HEADLIGHT CONTROL

Filed March 2, 1921

2 Sheets-Sheet 2

Inventor
C. W. Hall.
H. E. DeJarnette

By Lacey & Lacey, Attorneys

Patented Nov. 4, 1924.

1,514,155

UNITED STATES PATENT OFFICE.

CHARLES W. HALL AND HORATIO E. DE JARNETTE, OF PRINCETON, WEST VIRGINIA.

HEADLIGHT CONTROL.

Application filed March 2, 1921. Serial No. 449,143.

*To all whom it may concern:*

Be it known that we, CHARLES W. HALL and HORATIO E. DE JARNETTE, citizens of the United States, residing at Princeton, in the county of Mercer and State of West Virginia, have invented certain new and useful Improvements in Headlight Controls, of which the following is a specification.

This invention relates to an improved headlight control for motor vehicles and has as one of its principal objects to provide a mechanism whereby the headlights of a vehicle may, without releasing the steering wheel, be readily dimmed.

The invention has as a further object to provide a mechanism employing a button switch which may be mounted upon the steering wheel of the vehicle and wherein by simply operating said switch, the headlights of the vehicle may be dimmed.

A further object of the invention is to provide a mechanism which will not interfere with the usual instrument board switch control of the headlights.

And the invention has as a still further object to provide a mechanism which may be employed in conjunction with any ordinary motor vehicle lighting system.

Other and incidental objects will appear hereinafter.

Figure 2:
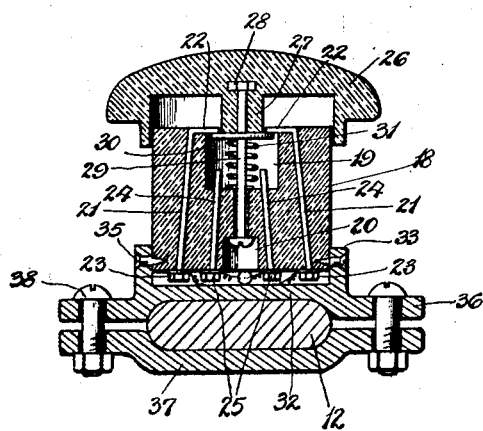
Figure 4:
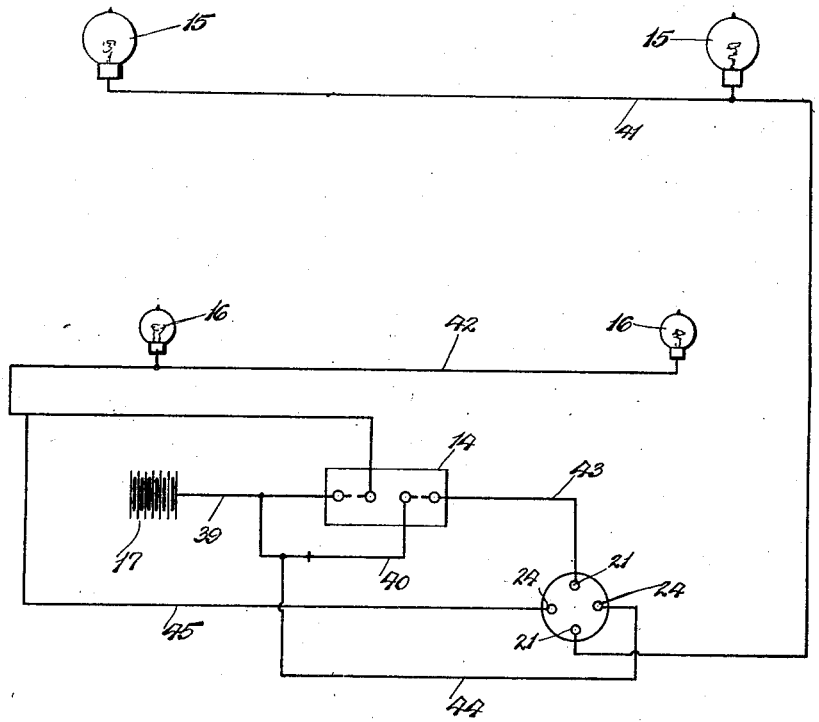
Figure 3:
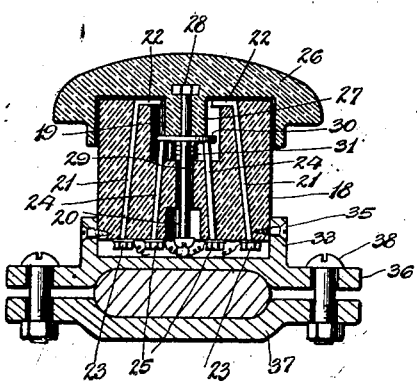

In the drawings:

Figure 1 is a perspective view showing a motor vehicle of conventional design equipped with the present invention, Figure 2 is a vertical sectional view particularly showing the button switch employed, Figure 3 is a view similar to Figure 2, illustrating the button of the switch depressed, and Figure 4 is a diagrammatic view showing the wiring system employed.

Referring now more particularly to the drawings, we have shown our improved control in connection with a motor vehicle of convention design. The steering post of the vehicle is indicated at 10 and the steering wheel at 11, this steering wheel being provided with the usual spider 12. The instrument board of the vehicle is indicated at 13 and mounted upon the instrument board is the usual switch 14 for controlling the headlights of the vehicle. As is customary, the headlights are, as suggested in Figure 4, provided with large light bulbs 15 and also with smaller light bulbs 16. In this figure we have indicated the battery of the vehicle at 17.

In carrying the invention into effect, we employ a button switch for controlling the vehicle headlights from the steering wheel. This button switch includes a cylindrical body block 18 of suitable insulating material, said body being provided at its upper end with an axial recess 19 and at its lower end with a somewhat smaller recess 20. Extending longitudinally through the body are upwardly converging conductors 21 provided at their upper ends with laterally directed terminals 22 overhanging the recess 19. Upon the lower ends of said conductors are threaded binding nuts 23. The body further carries a second pair of upwardly converging conductors 24 which, at their upper end portions, project into the recess 19 and upon the lower ends of said conductors are threaded binding nuts 25. Slidably fitting over the upper end of the body is a button or cap 26 provided axially with a depending boss or post 27 adapted to be freely received within the recess 19 between the terminals 22 of the conductors 21 and embedded in the cap is a nut 28. Like the body 18, the cap is also preferably formed of suitable insulating material. Freely slidable through the body is an axially disposed coupling pin 29 threaded into the nut 28 for connecting the cap with the body, the head of said pin normally lying within the recess 20, and surrounding the pin within the recess 19 is a contact disc 30. Bearing between this disc and the bottom wall of said recess is a spring 31 surrounding the pin, this spring normally holding the disc in engagement with the terminals 22 for closing a circuit therethrough and, as will be observed, the boss 27 of the cap rests against the disc so that the spring will also act to yieldably sustain the cap. Supporting the body 18 is a base 32, this base being provided with an upstanding annular flange 33 snugly receiving the body therein and engaged through said flange are screws or other suitable fastening devices 35 connecting the base with the body. The base is formed to fit over a spoke of the spider 12 of the steering wheel 11 of the vehicle and is provided at opposite sides thereof with lateral ears 36. Coacting with the base is a clamping plate 37 engaging beneath said spoke and fitting through said ears and through the plate are clamping bolts 38 securing the switch in position. As will be perceived, the switch may thus be readily mounted upon any ordinary steering wheel.

In Figure 4 of the drawings, we have shown the manner in which our improved switch is interposed in the lighting system of the vehicle. This system includes a wire 39 leading from the battery 17 to the switch 14 and connecting said wire with another terminal of the switch is a wire 40. Connecting the bulbs 15 of the headlights in series is a wire 41 and connecting the bulbs 16 in series is a wire 42 leading to the switch 14. To interpose the switch of the present invention in the system, the wire 41 is connected to one of the conductors 21 of the switch while a wire 43 is arranged to extend from the other of said conductors to the switch 14. One of the conductors 24 is connected with the wire 40 by a wire 44 while the other of the conductors 24 is connected with the wire 42 by a wire 45. Thus, as will be perceived, when the circuit to the light bulbs 15 is closed through the switch 14, current will flow through the button switch of the present invention to said bulbs, this circuit being normally closed through the button switch by the contact disc 30. However, when the cap 26 of the button switch is depressed and the disc is, as shown in Figure 3 of the drawings, moved to engage the conductors 24, the circuit through the bulbs 15 will be broken while the circuit through the bulbs 16 will be closed. Accordingly, the headlights will be dimmed and will remain so dimmed as long as the cap 26 is held depressed. Upon release of the cap, the circuit through the bulbs 16 will be broken while the circuit through the bulbs 15 will be again closed. Accordingly, it will be seen that the headlights may be readily controlled by means of the button switch and since this switch is mounted upon the steering wheel of the vehicle, it will be unnecessary to release said wheel as is now imperative when it is desired to operate the switch 14. As is well known, this condition is the underlying cause of frequent accidents and the present invention will, therefore, eliminate such cause. Should it be desired to permanently break the circuit through the bulbs 15 and energize the bulbs 16 as, for instance, when the vehicle is left standing, it will be seen that the switch 14 may be operated to accomplish the object desired.

Having thus described the invention, what is claimed as new is:

An electric switch including a body block provided with a recess, a pair of conductors extending through the block and provided with terminals overhanging the recess, a second pair of conductors extending through the block into the recess, a button having a boss movable into the recess, a pin extending through the recess slidably connecting the button with the block, a contact disc carried by said pin to coact with the boss, and a spring within the recess acting against said disc for sustaining the button and normally holding the disc in engagement with said terminals closing a circuit through the first pair of conductors, the button being movable for shifting the disc to engage the second pair of conductors for closing a circuit therethrough.

In testimony whereof we affix our signatures.

CHARLES W. HALL. [L. S.]
HORATIO E. DE JARNETTE. [L. S.]